United States Patent [19]

Pace et al.

[11] Patent Number: 5,216,347
[45] Date of Patent: Jun. 1, 1993

[54] STEPPER MOTOR CONTROL SYSTEM

[75] Inventors: Ermanno Pace; Mark J. McCormack, both of Phoenix, Ariz.

[73] Assignee: SGS-Thomson Microelectronics, Inc., Carrollton, Tex.

[21] Appl. No.: 677,438

[22] Filed: Mar. 29, 1991

[51] Int. Cl.$^5$ .............................................. H02P 8/00
[52] U.S. Cl. ..................................... 318/696; 318/685
[58] Field of Search .............................. 318/685, 696

[56] References Cited

U.S. PATENT DOCUMENTS

| | | | |
|---|---|---|---|
| 4,107,593 | 8/1978 | Anderson | 318/685 |
| 4,558,268 | 12/1985 | Besson et al. | 318/685 |
| 4,908,562 | 3/1990 | Back | 318/685 X |

*Primary Examiner*—William M. Shoop, Jr.
*Assistant Examiner*—Karen Masih
*Attorney, Agent, or Firm*—Kenneth C. Hill; Lisa K. Jorgenson; Richard K. Robinson

[57] ABSTRACT

A control system for controlling a stepper motor which uses six power transistors in a single, interconnected configuration with two stepper motor field coils. Two transistors are common to both field coils of the stepper motor with two stepper motor field coils. Control circuitry for switching the six transistors allows full and half step motor positioning to be performed. Transition phases are used between steady state phases to provide accurate motor operation. The transition phases are controlled entirely within the control circuitry without a requirement for input from outside the controller.

14 Claims, 11 Drawing Sheets

| POS | CURRENT DIR. | |
|---|---|---|
| | X | Y |
| 0 | + | 0 |
| 1 | + | + |
| 2 | 0 | + |
| 3 | − | + |
| 4 | − | 0 |
| 5 | − | − |
| 6 | 0 | − |
| 7 | + | − |

| INITIAL POSITION | FINAL POSITION | TRANSITION PHASE |
|---|---|---|
| 0 | 1 | T1 |
| 0 | 7 | T5 |
| 1 | 2 | T2 |
| 1 | 0 | T4 |
| 2 | 3 | T3 |
| 2 | 1 | T7 |
| 3 | 4 | T4 |
| 3 | 2 | T6 |
| 4 | 5 | T5 |
| 4 | 3 | T1 |
| 5 | 6 | T6 |
| 5 | 4 | T0 |
| 6 | 7 | T7 |
| 6 | 5 | T3 |
| 7 | 8 | T8 |
| 7 | 6 | T2 |

STEPPER MOTOR CONTROL SYSTEM

BACKGROUND OF THE INVENTION

1. Field of the Invention

The present invention relates generally to controls for electric motors, and more specifically to a control system for controlling operation of a stepper motor.

2. Description of the Prior Art

The construction, control, and use of stepper motors is well known to those skilled in the art. Because of their design, stepper motors are able to accurately position the rotor at multiple known locations. Because of this capability, stepper motors have many uses. For example, they are used to position the platen and print head in electronic typewriters and printers.

Controllers for stepper motors are used to energize the field coil windings in selected sequences to change the position of the armature. Various switching sequences of the different field coil windings are used to give full step and half step positioning of the armature. Stepper motors can also hold the armature in a fixed position. This is typically referred to as detent mode.

Stepper motors typically have 2 independent field coils, but other numbers may be used. For example, it is known to construct stepper motors having 5 field coils. The number of field coils, and the number of armature pole pairs used, determine the angular separation between each full or half step position. For example, a motor having 50 armature pole pairs and 2 field windings may be positioned at 200 different settings in the full step mode. This corresponds to an angular separation of 1.8°. Controlling this same motor in half step mode gives 400 positions, each 0.9° apart.

A H-bridge is provided for each field coil. Switching of transistors in the bridge is used to cause current to flow in either direction through the coil as desired. The transistors can also be turned off so that no current flows from the power supply through the coil. Controlling the switching of the transistors for the two coils steps the motor in a forward or reverse direction as desired.

Each bridge has four power transistors, so that eight are required for a typical two coil motor controller. These power transistors may be bipolar junction transistors or field effect devices. Since power transistors must conduct large driving currents, on the order of one or two amps for a typical medium-sized stepper motor, they must be physically large. As known in the art, large devices result in a low level of integration, so that control functions must be designed as separate chips.

It is desirable to increase integration levels for integrated circuits generally. It would be desirable to increase integration levels for stepper motor control circuitry. It would be further desirable to provide a control system for a stepper motor which utilized a lesser number of power transistors, allowing increased levels of integration.

SUMMARY OF THE INVENTION

It is therefore an object of the present invention to provide a system and method for controlling stepper motors.

It is another object of the present invention to provide such a system and method which uses less than eight power transistors while still accomplishing the same driving functions as are presently available.

It is a further object of the present invention to provide such a system and method which is compatible with standard stepper motors, so that the motor can be driven using the same control signals as are presently provided for stepper motor control.

Therefore, according to the present invention, a control system for controlling a stepper motor uses six power transistors in a single, interconnected configuration with two stepper motor field coils. Two transistors are common to both field coils of the stepper motor with two stepper motor field coils. Control circuitry for switching the six transistors allows full and half step motor positioning to be performed. Transition phases are used between steady state phases to provide accurate motor operation. The transition phases are controlled entirely within the control circuitry without a requirement for input from outside the controller.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1A:
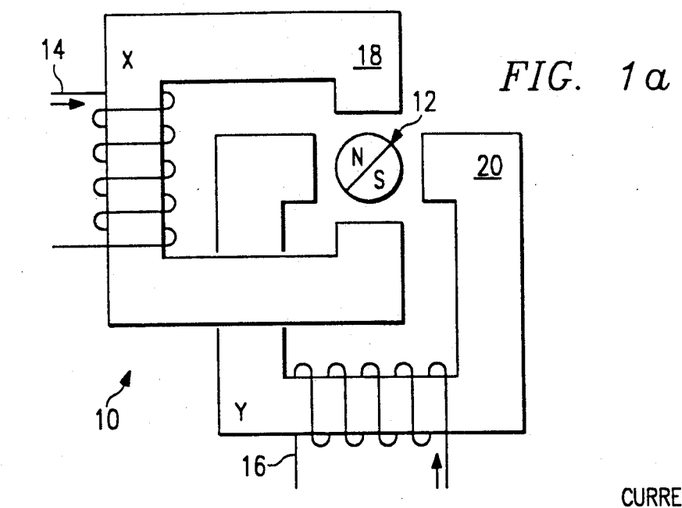
FIG. 1 illustrates diagrammatically and in tabular form current flows required to operate a two coil stepper motor.

FIG. 1(a) illustrates diagrammatically a stepper motor generally referred to with reference number 10. A rotor 12 is constructed as known in the art, and can be positioned precisely to drive external machinery (not shown). Field coils 14, 16 are energized in preselected patterns to position the rotor 12. The direction of current flow through the coils 14, 16 determines the direction of magnetization of armature pairs 18, 20, respectively. The motor 10 is shown diagrammatically as having only two armature pole pairs, but an actual motor typically has many more as known in the art.

Figure 1B:
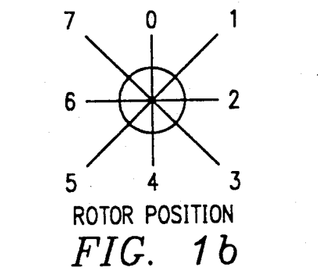

FIG. 1(b) illustrates the eight rotor positions for a motor having two armature pole pairs. Each position is 45° apart, assuming a half-step mode of operation. In full step mode, only the odd numbered positions are used, and they are 90° apart.

As is known in the art, if a motor having a greater number of armature pole pairs is used, each position corresponds to a smaller angular displacement. For example, a stepper motor having four armature pole pairs has an angular displacement of 22.5° for each half-step. There are still only eight positions which can be defined by currents flowing through the field coils. The 16 positions defined by a two armature pole pair motor can be visualized as two consecutive sets of positions 0-7, with each 0-7 set occupying 180° of rotation. Thus stepping from position 7 to position 0 moves the rotor into the next set.

Figure 1C:
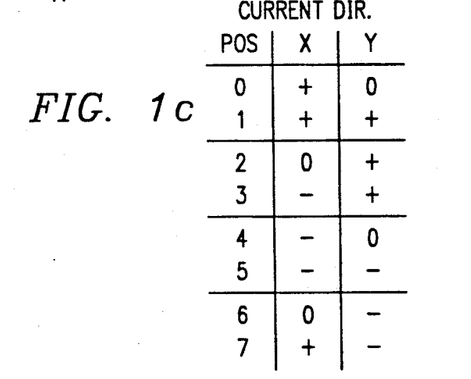

FIG. 1(c) describes current flow through each of the coils, 14, 16 to define each of the eight positions shown in FIG. 1(b). For example, in position 1 corresponds to a positive current flow through both coils, and position 7 corresponds to a positive flow through coil 14 and a negative flow through coil 16. In position 2, coil 16 has current flow in a positive direction, and no current flows through coil 14.

The rotor position shown in FIG. 1(a) corresponds to current flows through coils 14, 16 which causes armatures 18, 20 to have north magnetic poles below and to the right of the rotor 12. Assuming that positive current flow is defined as going into the leads of the coils 14, 16 in the direction of the arrows shown in FIG. 1(a), the rotor in FIG. 1(a) is in position 7 as defined in the table of FIG. 1(c). For the rotor to be in the position shown, the north poles of the armatures are located below and to the right of the rotor 12, caused by positive current flow into coil 14 and negative current flow through coil 16.

Figure 2:
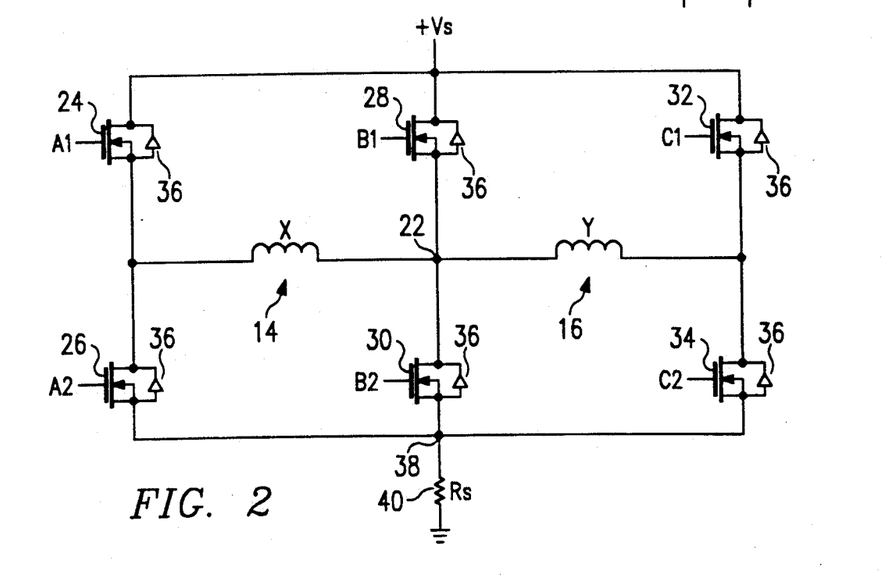
FIG. 2 is a schematic diagram of switching circuitry used to drive a stepper motor according to the present invention.

FIG. 2 shows preferred power switching circuitry for controlling the stepper motor according to the present invention. Coils 14 and 16 are connected at common node 22. For both coils 14, 16, positive current flow is defined as being through the respective coils toward the common node 22.

Three identical legs of power transistors are provided. The first leg consists of transistors 24 and 26. The second leg consists of transistors 28, 30. The third leg consists of transistors 32, 34. All of the transistors 24-34 are identical.

Each transistor 24-34 contains a parasitic diode 36 which is formed naturally as part of the process of fabricating field effect transistors. Transistors 24, 28, 32 are tied in common to a power supply Vs, and transistors 26, 30, 34 are tied in common to node 38. Sense resistor 40 (Rs) is preferably a low resistance, precision resistor used to sense current flow in the system. Resistor 40 functions in a similar manner to sense resistors used each H-bridge for stepper motor control systems according to prior art designs.

Figure 3:
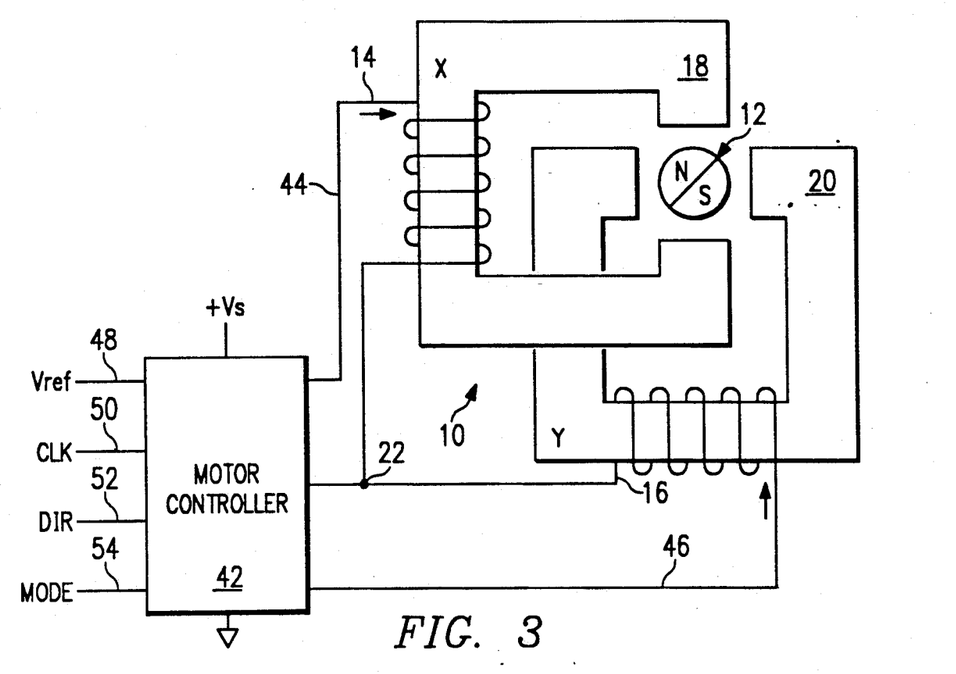
FIG. 3 is a block diagram illustrating operation of a two coil stepper motor according to the present invention.

FIG. 3 illustrates a single chip motor controller 42 which can be constructed in accordance with the teachings herein, and connected to motor 10. The two coils 14, 16 are connected at node 22. The only connections required between the motor 10 and the controller 42 are the two coil leads 44, 46, and a connection to the common node 22. If desired, the common node 22 can be located on the motor controller chip 42 with four coil connections being made to the coils 14, 16.

The controller 42 contains the six power transistors 24-34, as well as control circuitry (described below) for switching each of the power transistors on or off in order to drive the rotor 12 as desired. The controller 42 requires very few inputs, with those necessary being shown in FIG. 3. A power supply Vs and ground connections are required. A voltage reference input 48 is supplied, and is used for comparison with voltages measured across sense resistor 40 in order to determine levels of current flow through the motor. A clock input 50 causes the rotor 12 to commutate (step) from its current position to an adjacent position. Each pulse input to the clock input 50 causes the rotor to step one position. The direction of rotor commutation is defined by an input direction signal 52, and a mode input 54 is used to control whether such rotor commutation is performed in full step or half-step mode.

If desired, a separate voltage supply and ground (not shown) can be provided for the logic circuitry within the motor controller 42. This tends to insulate the control circuitry from supply bounce effects caused by switching the power transistors.

FIGS. 4-11 show the current flows through the power switching transistors 24-34 for the different rotor positions shown in FIG. 1(c). Transitional phases from the next lower numbered position are also shown in each figure. Subfigure (a) of each of FIGS. 4-11 shows the transition phase and Subfigure (b) shows current flows for the actual position (steady state phase). For example, FIG. 4(b) shows the current flows for position 0, and FIG. 4(a) shows the current flows for a transitional phase from position 7 to position 0. FIG. 5(a) shows current flow for a transitional phase between position 0 and position 1, while FIG. 5(b) shows the currents for the steady state phase of position 1.

Three different types of current flow will be referenced in the following description. The first type is a steady state, or increasing to steady state, current flow caused by application of a supply voltage across one or both of the field coils 14, 16. This is shown in FIGS. 4-11 as an unbroken line.

The other two types of current are caused by the collapse of the magnetic field in the inductive coils when the power source is removed. Both of these currents are shown in FIGS. 4-11 as dotted lines. As is known in the art, these currents decay exponentially as a function of the voltage drop across the coils. A higher voltage drop across the coil implies a higher current flow and thus a faster decay. These two currents will be referred to herein as a slow recirculation current, and a fast decay current. These terms relate to the rate at which the current through the inductor decays.

The difference in these two currents can be described in connection with FIG. 4(a). For purposes of the following descriptions, an exemplary preferred embodiment assumes that the source Vs is a 48 volt source. In addition, the assumption is made that the voltage drop across any of the transistors 24-34 is approximately 0.3 to 0.5 volts when such transistors are on. A similar voltage drop occurs across the parasitic diodes of such transistors when current flows through them.

Figure 4A:
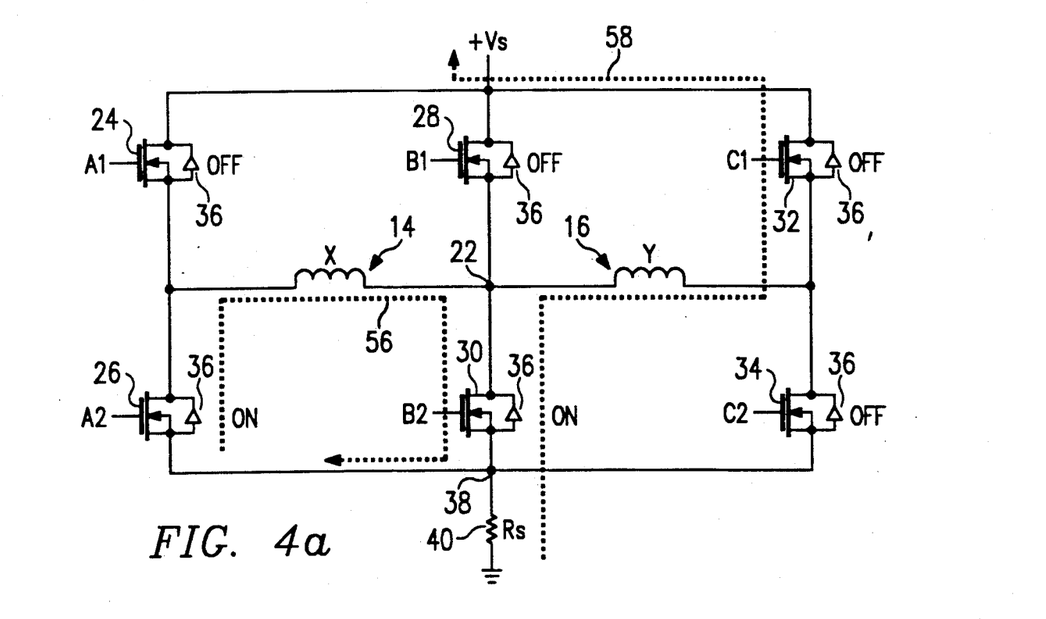
FIGS. 4–11 illustrate current flows through the switching circuitry of FIG. 3, for eight steady state and transitional phases.

Prior to the transition phase shown in FIG. 4(a), the rotor is assumed to be in position 7. As shown in FIG. 1(c), and diagrammed in FIG. 11(b), current is flowing from left to right through both of the field coils 14 and 16. To enter transition phase 0 (FIG. 4(a)), transistors 24-34 are switched into the positions shown. Transistors 26 and 30 are on, while the remaining transistors are turned off. Both field coils 14, 16 previously had current flowing from left to right, causing a magnetic field to be generated in each coil. Once the power supply is removed, which occurs when all of the upper transistors 24, 28, 32 are turned off, collapse of these magnetic fields causes current to continue flowing in the same direction.

As known by Kirchoff's voltage law, the sum of the voltages around the lower left loop must be 0 volts. Since the on voltages for transistors 26 and 30 is approximately 0.3 to 0.5 volts, the voltage drop across field coil 14 will be approximately 0.8 volts. At this low voltage, the magnetic field in the coil 14 decays relatively slowly. Current indicated by flow line 56 is relatively low, and is referred to as a slow recirculation current.

Current indicated by flow line 58 flows through a loop consisting of resistor 40, transistor 30, field coil 16, transistor 32, and the power supply. Since the power supply is fixed at 48 volts, the voltage drop across the remaining elements must also be 48 volts. As described above, the voltage drop across transistors 32 and 32 is approximately 0.4 volts, and the drop across resistor 40 is low, typically a few tenths of a volt. Thus, the drop across field coil 16 is in the neighborhood of approximately 47 volts, causing a relatively high loop current to flow. Since the voltage drop across field coil 16 is roughly 47 volts and the drop across field coil 14 is less than one volt, the magnetic field of coil 16 collapses approximately 50 times faster than that of coil 14. For practical purposes, the current through field coil 14 remains relatively constant, while that through coil 16 diminishes quickly.

The arrowheads on current flow lines 56, 58 indicate the direction of current flow. Thus, slow recirculation current 56 through field coil 14 circulates in a clockwise direction through the lower left quadrant of the power switching circuitry. Fast decay current 58 flows generally upwardly through the switching circuitry, and returns through the power supply.

As described above, the current flows of FIG. 4(a) are used merely as a transition phase. Once the fast discharge current 58 has decayed to 0 volts, the control circuitry switches the power transistors 24-34 to the positions shown in FIG. 4(b). This corresponds to position 0 of the rotor. In position 0, current flows through coil 14 in a positive direction (toward node 22), while no current flows through field coil 16. Current line 60 indicates such current flow.

Figure 4B:
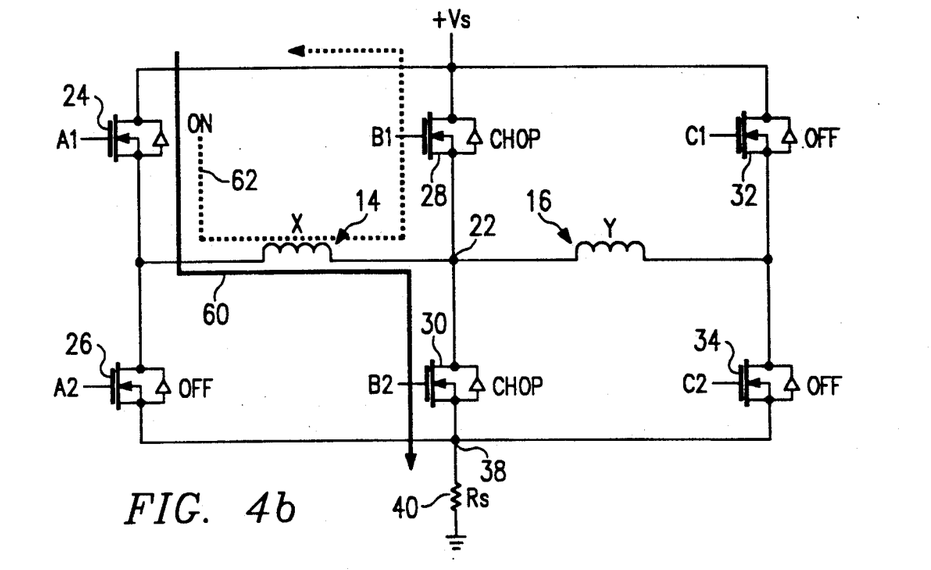

As known in the art, a high voltage Vs is applied to a stepper motor designed for lower voltages in order to improve response time. Typically, a Vs of 48 volts is applied to a 5 volt stepper motor. If the motor is designed to carry one ampere of current, field coils 14 and 16 have a nominal resistance of 5 ohms. If 48 volts were simply impressed across field coil 14, a current of 10 amperes would result, burning out the motor. It is therefore necessary to provide current limiting so that the current through coil 14 is limited to approximately one ampere.

As is known in the art, such limiting can be performed by using a "chopping" circuit. This control circuit senses the current through coil 14 by measuring the voltage drop across sense resistor 40. If resistor 40 has a value of one ohm, a one volt drop across it indicates a current flow of one ampere. When a one volt drop is detected, transistor 30 is turned off for a short period of time. This allows the current through field coil 14 to decay slightly, at which time transistor 30 is again turned on. Thus, the current 60 is actually an oscillating current having a DC value of approximately one ampere, and a small amplitude.

The term "chop" applied to transistors 28 and 30 indicates that they are alternately turned on and off to perform this current limiting function. Transistors 28 and 30 are turned off and on in a complementary fashion, so that transistor 28 is on whenever transistor 30 is off. When transistor 30 is on, current 60 flows as indicated in FIG. 4(b). When transistors 28 and 30 change state, a slow recirculation current 62 is induced in the upper left quadrant of FIG. 4(b), circulating in a counterclockwise direction. Since both transistors 24 and 28 are on at this time, only a small (approximately 0.8 volts) voltage drop occurs across field coil 14, so that its discharge rate is relatively slow. Transistors 28, 30 then change state again, allowing current 60 to again flow as shown. The power transistors remain in the setting shown in FIG. 4(b) until it is desired to move the rotor from position 0 to position 1.

Figure 5A:
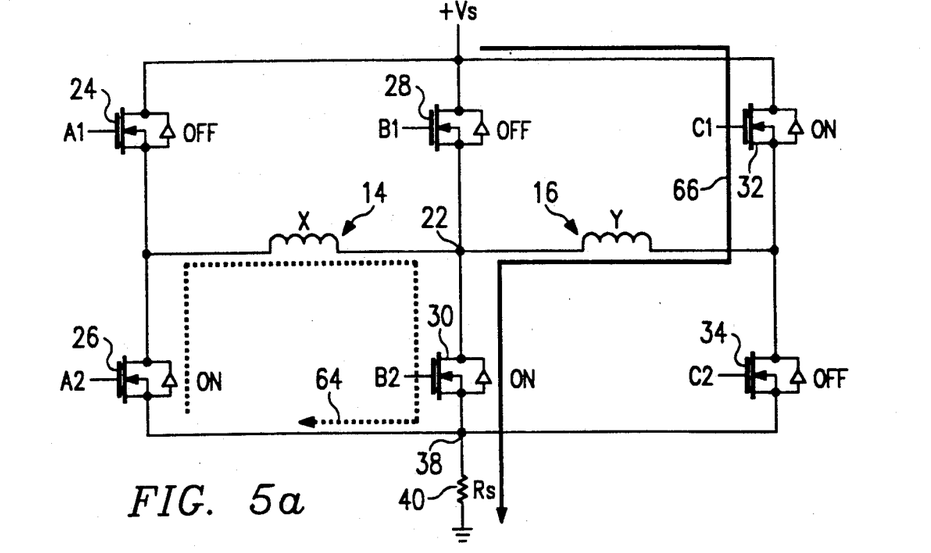
Figure 5B:
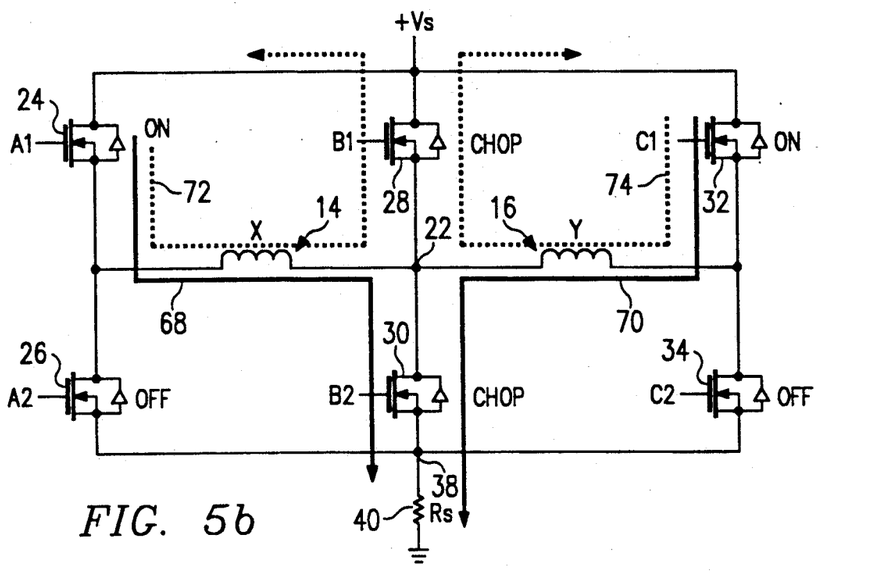

FIG. 5 illustrates the position 1 transition phase (5(a)) and the position 1 steady state phase (FIG. 5(b)). To move from position 0 to position 1, generally, it is necessary to hold the current already flowing through field coil 14, and simultaneously generate a current flowing through field coil 16 in the positive direction. Thus, transistors 24-34 are switched to the positions shown in FIG. 5(a). This causes a slow recirculation current 64 to flow through field coil X, while current 66 builds up through field coil 16. Current 66 builds up to the rated value of the motor fairly quickly because of the high voltage Vs as described above. Once current 66 has reached the full rated value, the control circuitry causes power transistors 24-34 to switch to the position shown in FIG. 5(b).

As shown in FIG. 5(b), currents flow from the power supply through transistors 24, 32, through field coils 14, 16 toward node 22, and to ground through transistor 30. Currents 68 and 70 are equal in magnitude. Total current through both coils 14, 16 is sensed across sense resistor 40, and this signal is used to provide chopping on transistors 28, 30. When transistor 30 is turned off, transistor 28 is turned on and recirculation currents 72 and 74 are set up in the upper left and upper right quadrants, respectively. The voltage drop across each of the field coils 14, 16 is less than approximately 1 volt since only two transistor voltage drops are found in each loop.

Since two coil currents are flowing through resistor 40 at the same time, the chopping circuit should not be set to trigger on the same value as it is set for when only one coil current is flowing. Assuming that a current of one ampere flows through each coil in the steady state position, the chopping circuit could be set to trigger on a two ampere current flow through sense resistor 40. However, it is known in the art that rotor movement is smoother if the vector sum of the fields in each rotor position is the same. This is caused in position 1 by having each of the currents 68, 70 have a value of approximately 0.7 amperes, which is SQRT(2)/2. Thus, in position 1 the chopping circuitry is preferably set to trigger when the current sense resistor 40 is equal to approximately 1.4 amperes.

Figure 6A:
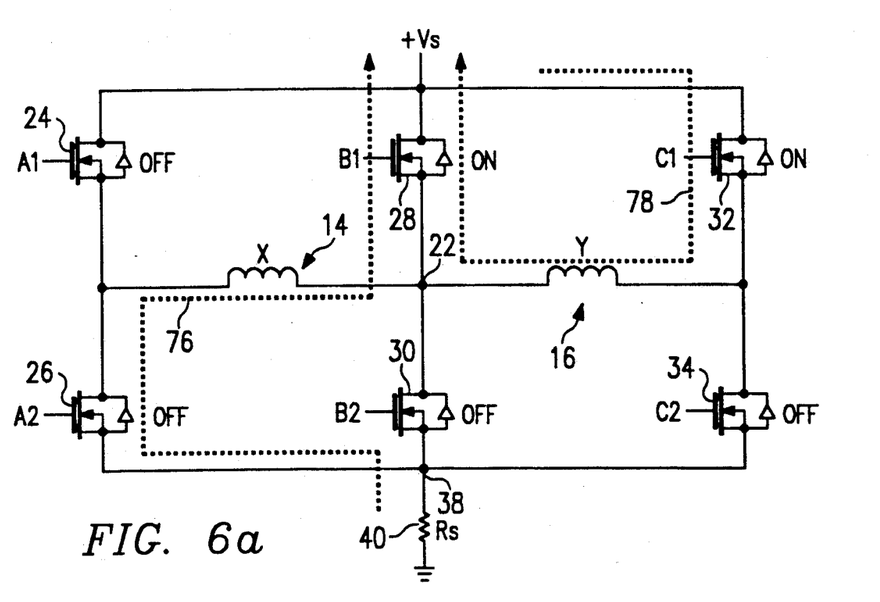

FIG. 6(a) shows the transition phase from position 1 to position 2. Field coil 14 discharges through fast decay current 76, while the current through field coil 16 is maintained by slow recirculation current 78. When the current through field coil 14 decays to 0, the control circuitry switches the power transistors 24-34 into the positions shown in FIG. 6(b).

Figure 6B:
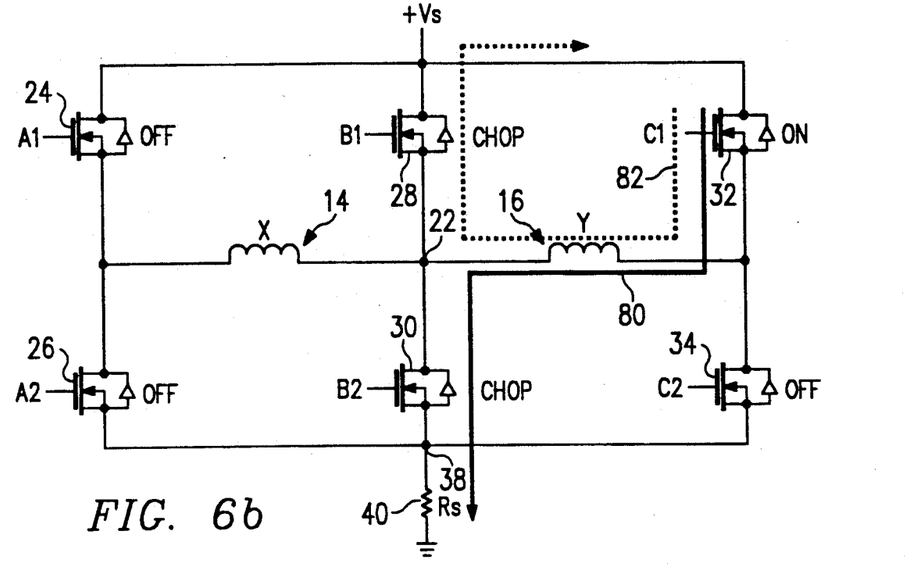

FIG. 6(b) is the position 2 steady state. In this state, no current flows through field coil 14, while the rated current flows through field coil 16. Transistors 28 and 30 are chopped in the same manner as occurred in position 0 described in FIG. 4(b). When transistor 30 is on, the current through field coil 16 builds up to the rated value. When the voltage across sense resistor 40 indicates that the rated value has been reached, transistor 28 is turned on while transistor 30 is turned off. This causes recirculation current 82 to flow through the upper right quadrant of FIG. 6(b) until the states of transistors 28 and 30 are again changed.

Figure 7A:
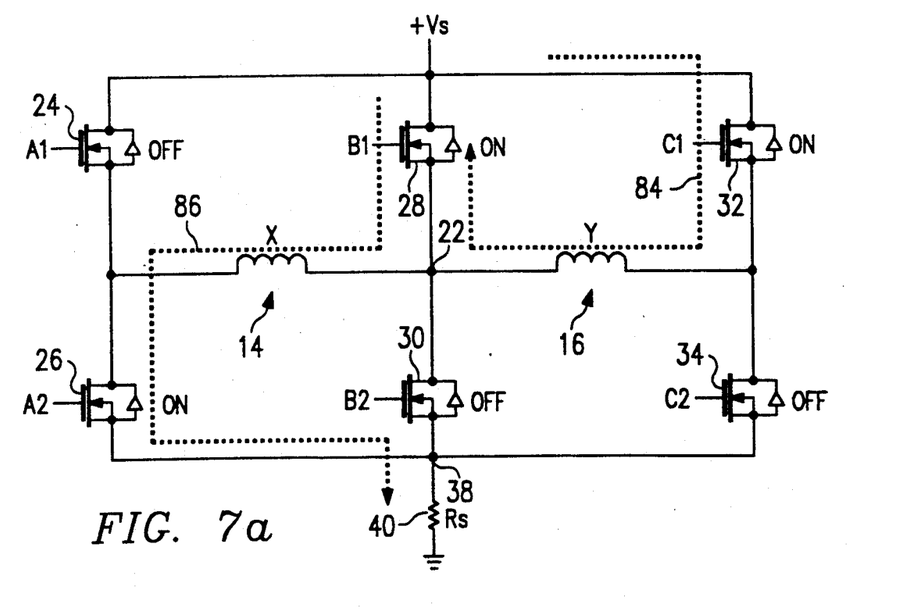
Figure 7B:
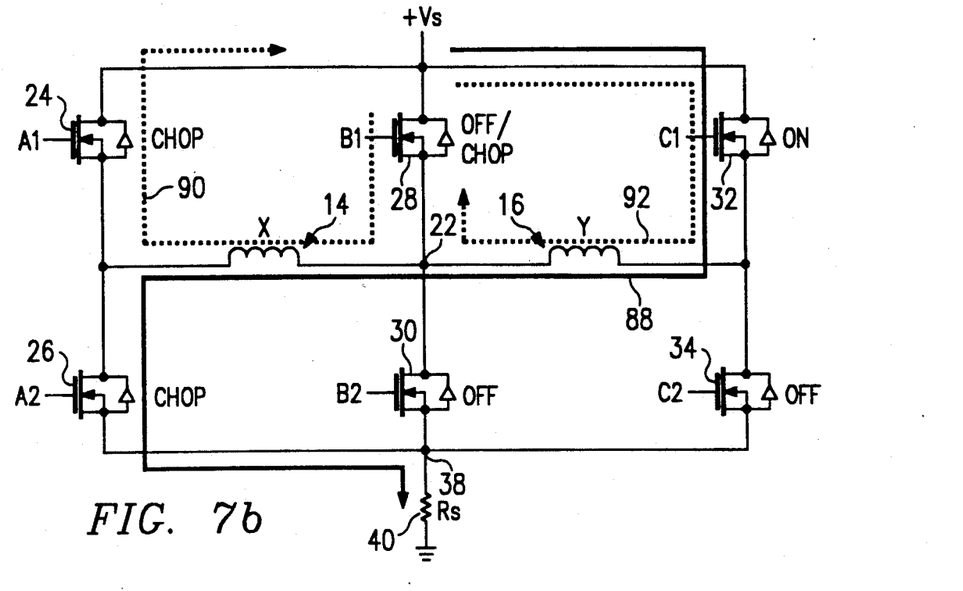

FIG. 7 shows the current flows for position 3. FIG. 7(a) shows the position 3 transition state, in which slow recirculation current 84 maintains the current flow through field coil 16. It is necessary to build up a current, in the negative direction, through field coil 14. This is accomplished by causing current to flow through transistor 28, field coil 14, and transistor 26. Once current 86 has built up to the rated value, transition phase 3 ends and the position 3 steady state phase, shown in FIG. 7(b) begins.

Current 88 flows through both of the field coils 14, 16 in series. When current 88 reaches the rated value, transistor 26 is turned off, and transistors 24 and 28 are both turned on. Note that transistor 28 is off while transistor 26 is on. This allows slow recirculation currents 90, 92 to maintain current flow through both of the field coils 14, 16 respectively.

As described above, it is preferable to have a current flow of only 0.7 amps (assuming a 1 ampere rated current) when current is flowing through both coils. Thus, the chopping circuitry is set to trigger when current 88 reaches a value of 0.7 amperes.

Figure 8A:
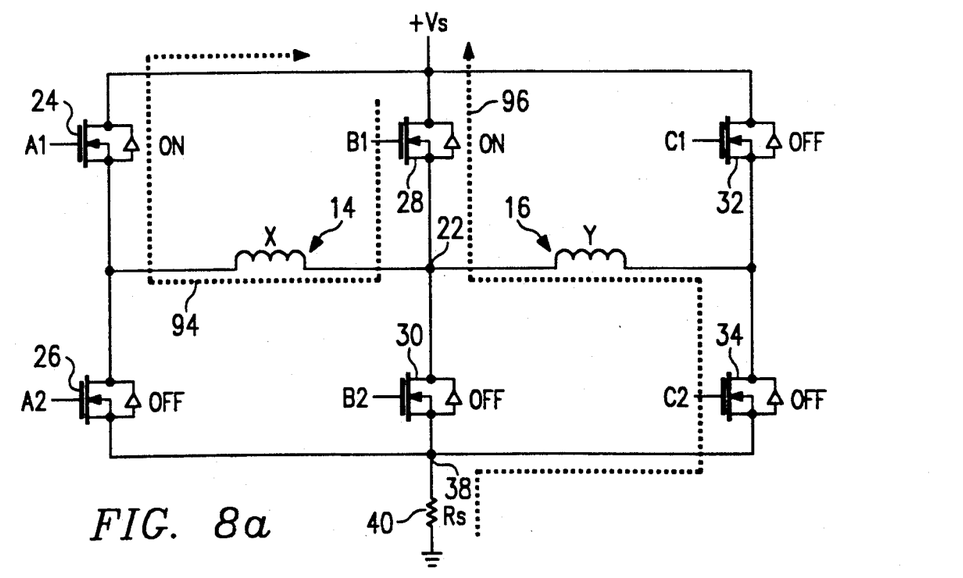

The transition phase to position 4 is shown in FIG. 8(a). In this transition, it is necessary to maintain the negatively flowing current through field coil 14, while allowing the current through coil 16 to discharge to 0. Therefore, the transistors are switched as shown, and slow recirculation current 94 maintains the current flow through field coil 14. Fast decay current 96 quickly decays to 0.

Figure 8B:
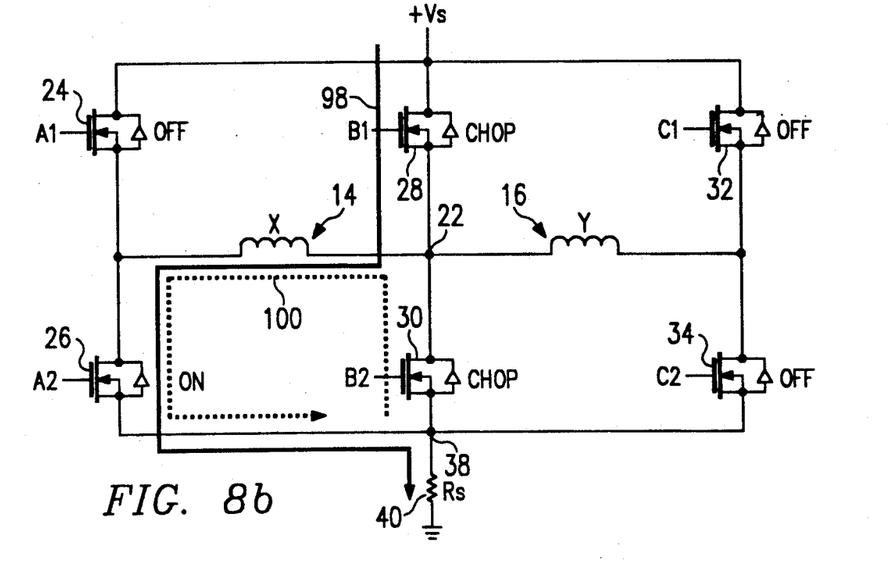

When current 96 decays to 0, the position 4 steady state is entered as shown in FIG. 8(b). In this position, a negatively directed current 98 flows through field coil 14. While current 98 is flowing, transistor 28 is on and transistor 30 is off. When current 98 reaches the rated value, transistors 28 and 30 are switched so that recirculation current 100 circulates in a counterclockwise direction through the lower left quadrant.

Figure 9A:
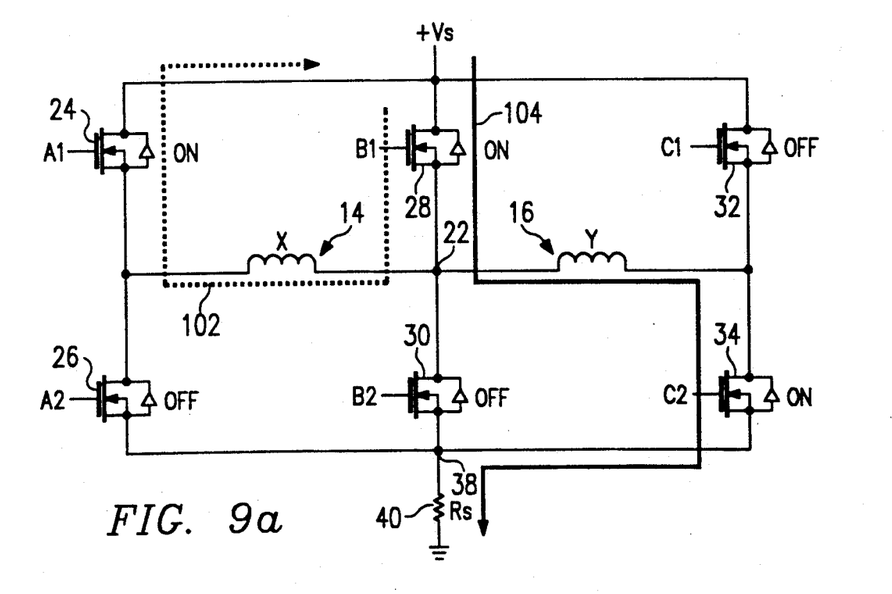
Figure 9B:
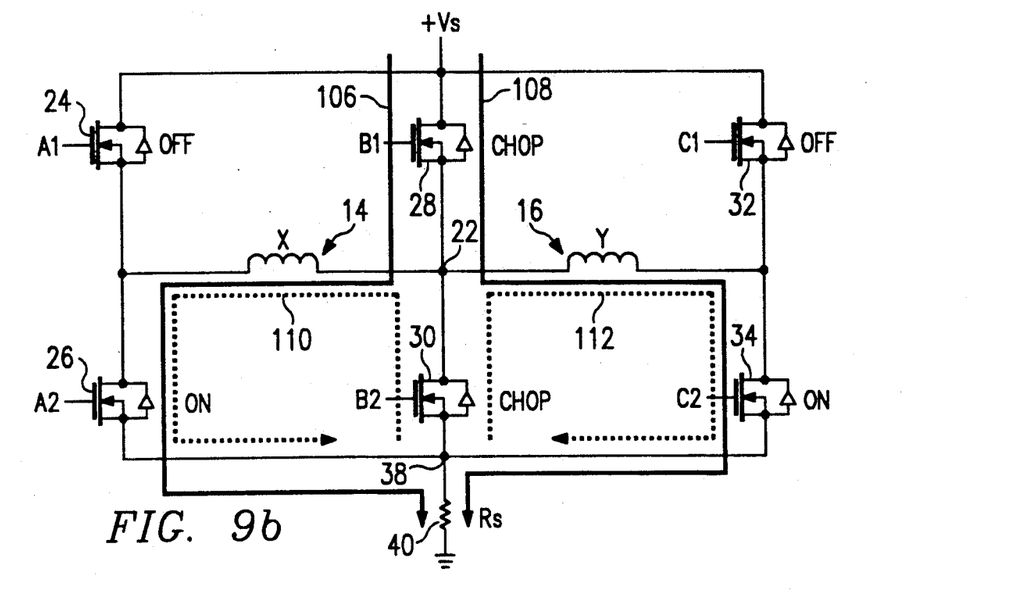

In position 5, negatively flowing current (directed away from node 22) flows through both field coils 14, 16. Therefore, the switching state shown in FIG. 9(a) is used to define the position 5 transition phase. Slow recirculation current 102 is allowed to flow through field coil 14, while current 104 builds up to the rated value through field coil 16. When current 104 reaches the rated value, the position 5 steady state phase is entered as shown in FIG. 9(b).

Currents 106, 108 flow in the negative directions through field coils 14, 16, respectively. As described above, the chopping circuitry preferably is triggered when the sum of these currents is approximately 1.4 times their rated value for each coil. Slow recirculation currents 110, 112 maintain the current through the field coils 14, 16 during chopping.

Figure 10A:
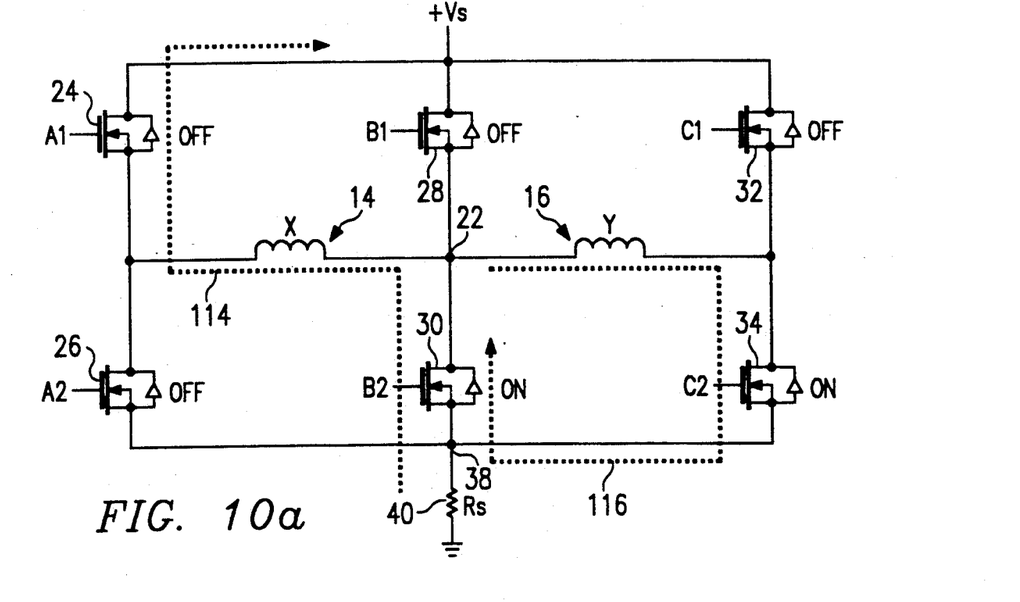
Figure 10B:
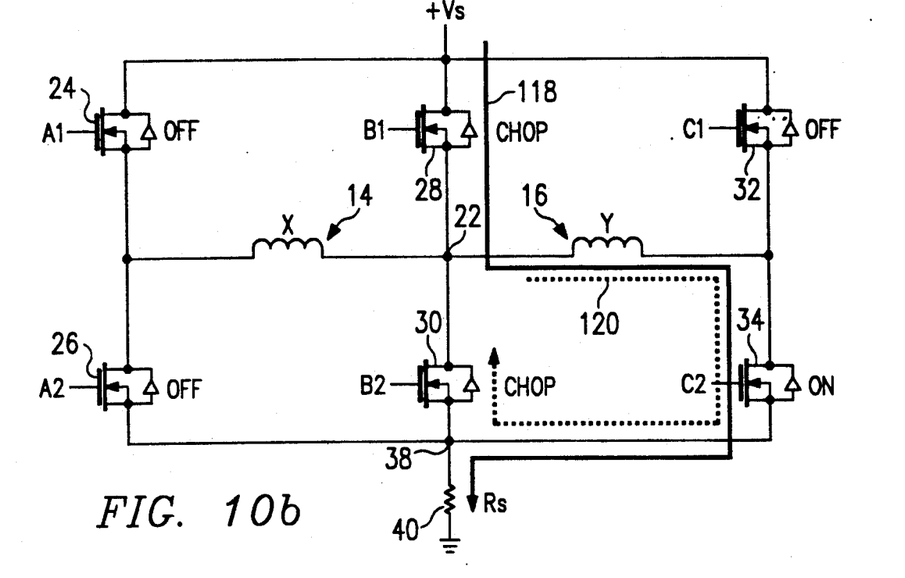

FIG. 10(a) illustrates the transition phase from position 5 to position 6. It is necessary to discharge field coil 14 with fast decay current 114, while maintaining the current through field coil 16 through recirculation current 116. When current 114 decays to 0, the position 6 steady state phase is entered as shown in FIG. 10(b).

In steady state position 6, current 118 is maintained at approximately the rated value. During chopping, slow recirculation current 120 maintains the current through field coil 16. No current flows through field coil 14.

Figure 11A:
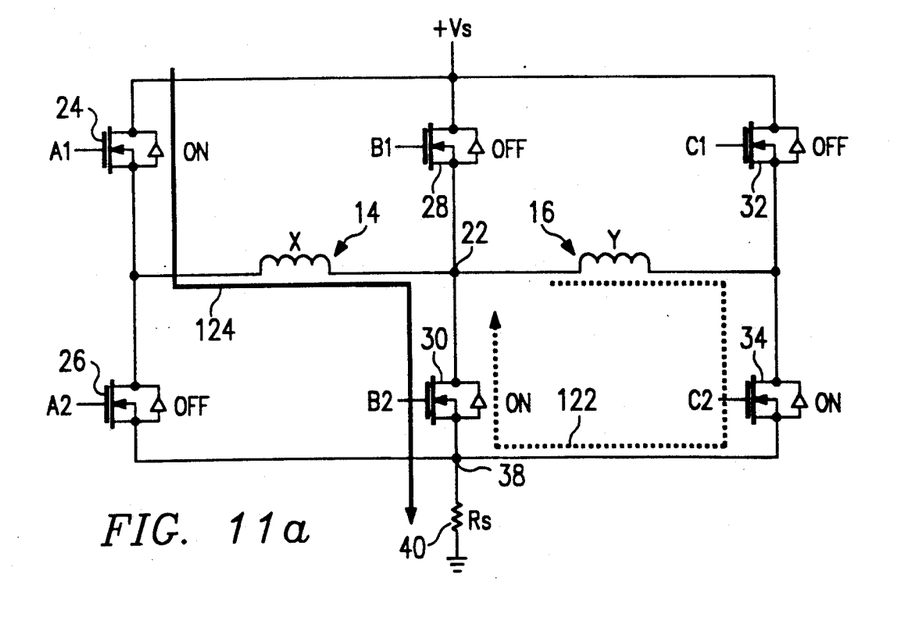
Figure 11B:
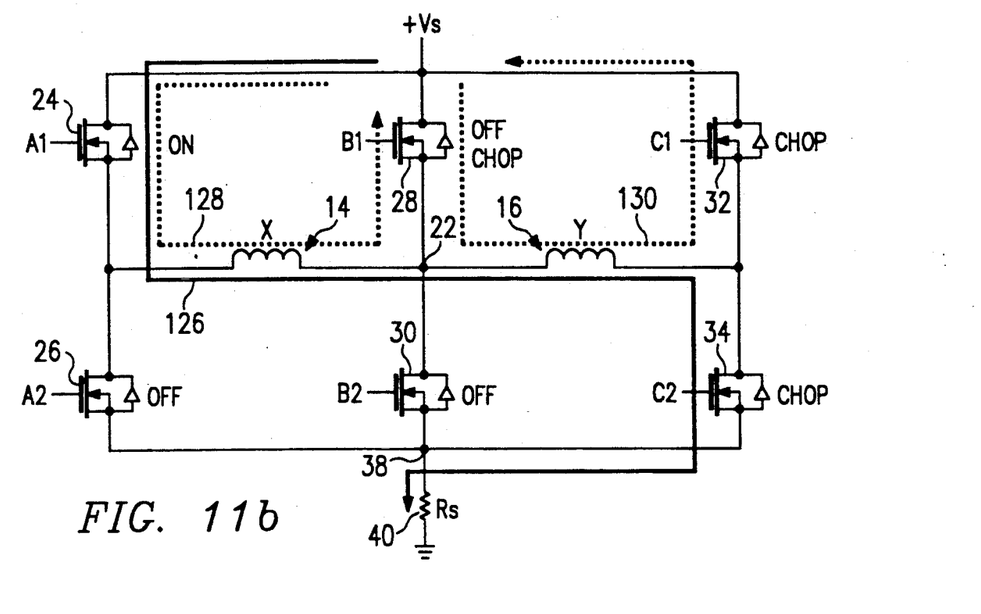

FIG. 11(a) shows the position 7 transition phase from position 6. The current through field coil 16 is maintained with slow recirculation current 122, while the current 124 through field coil 14 is increased to the rated value. when current 124 reaches the rated value, the position 7 steady state phase is entered as shown in FIG. 11(b).

Current 126 flows through both field coils 14, 16, and preferably is maintained at a value of 0.7 amperes as described above. During chopping recirculation currents 128, 130 maintain the currents on coils 14, 16 respectively. Three transistors, 28, 32, and 34 are involved in the chopping process in the same manner as described in connection with FIG. 7(b).

Each of the steady state positions described above was described with a corresponding transition phase. This transition phase is the one which is used when moving from a lower numbered steady state phase to the higher phase. The position 0 transition phase is used when moving from position 7 to position 0.

It will be appreciated by those skilled in the art that the purpose of the transition phase is to adjust the coil current in preparation for the next steady state phase. This ensures that, when currents flow through both coils 14, 16, the currents are equal. If the next position was entered directly, without the transition phase, the currents to the two coils would be different. Since the chopping circuitry senses only the sum of the currents through the two coils, it is not capable of independently determining, and controlling, the current through the two coils in order to equalize them.

When the rotor is commutated in the opposite direction, from a higher number position to a lower position, different transition phases must be used. For example, when transitioning from position 4 to position 3, the position 3 transition phase is not used. Instead the position 1 transition phase is used to maintain the current on field coil 14 while building up the current through field coil 16.

Figure 12:
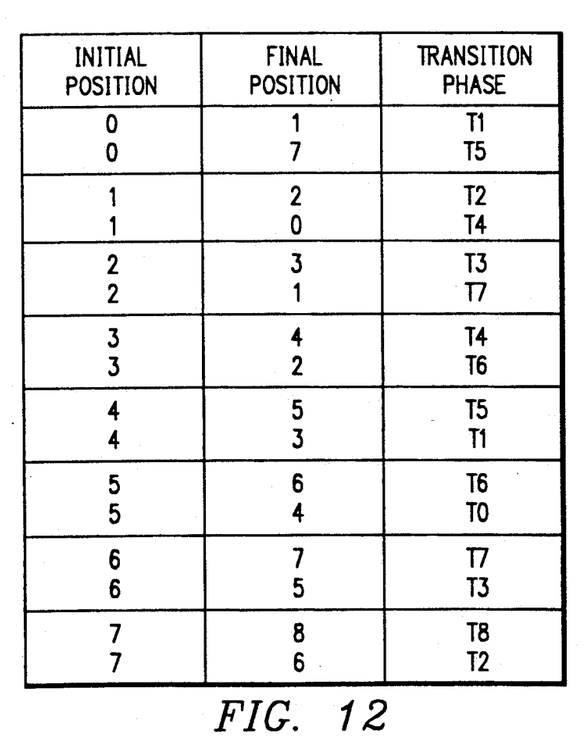
FIG. 12 is a table indicating transitional phases to be used in transitioning between pairs of steady state phases.

FIG. 12 is a table indicating the proper transition phases to be used when moving a half-step between an initial position and an adjacent final position in either direction. Consistent with the earlier description, moving from a lower numbered initial position to a higher numbered final position utilizes the transition phase associated with the final position. Different transition phases are used for moving in the opposite direction, as shown in the table.

For example, when moving from position 2 to position 3, the transition phase associated with position 3 is used. It is necessary to maintain the current through coil 16 while establishing a current through coil 14. However, when moving from position 3 to position 2, the table of FIG. 12 indicates that the transition phase associated with position 6 should be used. This transition phase is appropriate because it is necessary to discharge the field coil 14 while maintaining the current on field coil 16. FIG. 12 provides a complete table of transition phases used when moving between any pair of steady state positions in half-step mode.

If the motor is operated on full step mode, only rotor positions 1, 3, 5, and 7 are used. A similar transition phase is utilized between each steady state position as in the half-step mode. Normally, half-step operation is more common than the use of the full step mode.

Figure 13:
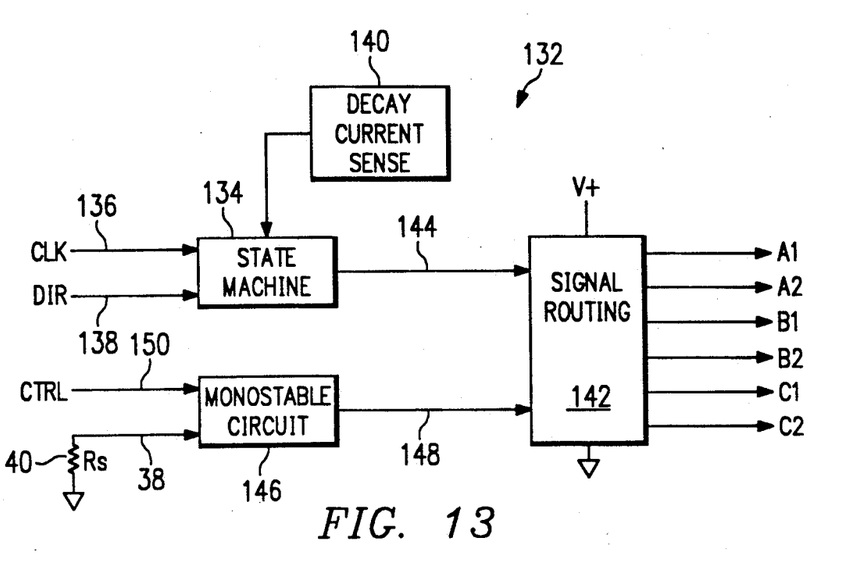
FIG. 13 is a block diagram of control circuitry for driving the switching circuitry of FIG. 3.

FIG. 13 shows a block diagram of control circuitry 132 used for driving power switching transistors 24-34. A state machine 134, constructed according to principles well known in the art, causes the appropriate transitions between positions as described above. As input, the state machine 134 requires a clock signal 136 and a direction signal 138. Each time a pulse occurs on the clock input 136, a transition is made from the current position to one of the two adjacent positions. The direction input 138 controls the direction of such transition. The state machine implements the table of FIG. 12 to determine which transition phase to enter, and a change is made to the target steady state position when a signal from the decay current sense circuitry 140 indicates that the appropriate coil current has reached its desired value.

Signal routing circuitry 142 converts the outputs 144 of the state machine 134 into the six control gate signals required to be applied to the transistors 24-34. The outputs 144 are determined using the switch states as described in FIGS. 4-11, and can easily be implemented by a person skilled in the art.

Monostable circuit 146 is used to control the chopping functions, and provides an output 148 to be connected to the signal routing circuitry 142. The transistors which are to be controlled by the chopping circuitry output 148 are defined by the state machine output signals 144. The monostable circuit 146 senses the current through sense resistor 40 to determine when the chopping function should occur. Miscellaneous control signals 150 may also be provided to the monostable circuit to program it to function as desired.

A preferred design for monostable circuit 146 is described in currently co-pending U.S. patent application Ser. No. 07/414,699 titled Programmable Stepper Motor Controller, assigned to the Assignee hereof now U.S. Pat. No. 5,032,7 . Other circuitry for performing the same function, as known in the art, may be used instead.

The decay current sense circuitry 140 may be implemented in several different ways. All of the required sensing can be performed across the sense resistor 40 if desired. Performing this function requires that the amplifier for sensing the voltage across the resistor 40 be able to sense the voltage drop in either direction. For example in the transition phase for position 0, the required sensing is to determine when current flowing upward through resistor 40 reaches 0.

Sensing of voltage drop in either direction across resistor 40, with one end tied to ground, requires that some portion of the circuitry carry a negative voltage. This may not be consistent with the design of a CMOS control circuit, and such bidirectional sensing may not be available. If this is the case, it is necessary to provide an alternative arrangement for sensing when a fast decay current has reached 0.

Figure 14:
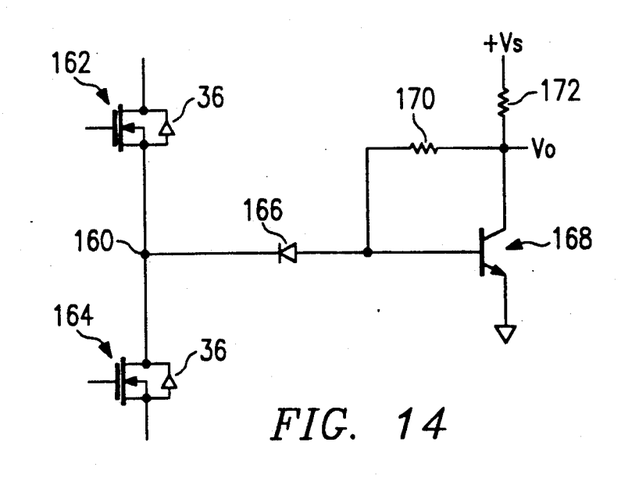
FIG. 14 illustrates a circuit through stepper motor field coils.

One such current sensing circuit is shown in FIG. 14. It connects to a node 160 between upper and lower transistors 162, 164. The sensing circuit is used on both the A and C legs of the motor drive circuitry, so transistors 162 and 164 correspond respectively to either transistors 24 and 26, or to transistors 32 and 34. Parasitic diodes 36 operate as described previously.

When a motor coil 14 or 16 is discharging from ground, as shown in FIGS. 4(a), 6(a) 8(a) and 10(a), the circuit of FIG. 14 is used to detect the event that the coil has fully discharged. When current is flowing through sense resistor 40 toward node 38, the voltage drop across the resistor 40 and the lower parasitic diode 36 causes the voltage at node 160 to be below ground potential. This turns diode 166 on. When diode 166 is on, the base of transistor 168 is at or below ground, and the base-emitter junction of transistor 168 is reverse biased, turning transistor 168 off. The transistor 168 remains off until the voltage at node 160 rises to approximately ground potential, which occurs when the motor coil is nearly fully discharged. When the voltage at node 160 rises, diode 166 is reverse biased and transistor 168 turns on. Resistor values for resistors 170 and 172 are chosen so that transistor 168 is on when diode 166 is reverse biased.

When transistor 168 is on, the voltage Vo is low. This indicates that the coil connected to node 160 has not fully discharged. When the transistor 168 is off Vo is high, indicating that the transition phase discharged is not yet complete. The value of Vo is considered only during the transition phases which require a coil to discharge as shown in FIGS. 4(a), 6(a), 8(a), and 10(a). Vo transitions low to indicate the end of the transition phase. The value of Vo is ignored at other times. The control system described herein provides a technique for driving a stepper motor which uses a total of only six power switching transistors. The control function for six transistor switching circuit is more complicated than typically found in prior art eight power transistor devices, but can still be implemented in a straightforward manner. The extra control circuitry requires much less space on an integrated circuit chip than the two power transistors which are replaced. Thus, even with the more complex control function, the described system can be more easily integrated onto a single chip than can prior art systems. The functioning of the stepper motor is identical to prior art techniques, as far as the user is concerned, since the newly introduced transition phases are handled completely internally to the control circuitry. Thus, it is not necessary for a designer to learn new techniques for controlling stepper motors to make use of the described invention.

While the invention has been particularly shown and described with reference to a preferred embodiment, it will be understood by those skilled in the art that various changes in form and detail may be made therein without departing from the spirit and scope of the invention.

What is claimed is:

1. A controller for a stepper motor having first and second coils, comprising:
    a common electrical node connecting a first end of each coil;
    a first transistor switch connected between said common node and a first power supply node;
    a second transistor switch connected between said common node and a second electrical node;
    third and fourth transistor switches connected between the first power supply node and second ends of the first and second coils, respectively;
    fifth and sixth transistor switches connected between the second electrical node and the second ends of the first and second coils, respectively;
    control circuitry including a state machine defining a plurality of normal states and a plurality of transition states, each of said normal and transition states corresponding to a selected pattern of on and off states for said transistor switches; and
    decay current sense circuitry for sensing current flow through said coils during a transition state;

wherein the rotor is moved from a first to a second position in response to a control input signal, each position having a corresponding normal state, and wherein said control circuitry causes said state machine to move through a selected transition state between the normal states, with said state machine remaining in such transition state until said decay current sense circuitry senses that current flow through said coils has reached a predetermined value, at which time said state machine moves into the normal state corresponding to the second rotor position.

2. The controller of claim 1, wherein said transistor switches comprise power field effect transistors.

3. The controller of claim 1, wherein the transition states are defined so that an exponential decay current through one coil decays relatively slowly, while a current through the other coil increases or decreases at a relatively fast rate.

4. A stepper motor positioning system, comprising:
a stepper motor having a rotor and a stator;
first and second field coils wound adjacent to said stator;
first, second, and third transistor switch pairs, each pair having two transistor switches connected in series, with a first, second, and third electrical node respectively connected between the transistor switches of each switch pair;
wherein said first coil is connected between the first and second nodes, and said second coil is connected between the second and third nodes;
control circuitry including a state machine defining a plurality of normal states and a plurality of transition states, each of said normal and transition states corresponding to a selected pattern of on and off states for said transistor switches; and
decay current sense circuitry for sensing current flow through said coils during a transition state;
wherein the rotor is moved from a first to a second position in response to a control input signal, each position having a corresponding normal state, and wherein said control circuitry causes said state machine to move through a selected transition state between the normal states, with said state machine remaining in such transition state until said decay current sense circuitry senses that current flow through said coils has reached a predetermined value, at which time said state machine moves into the normal state corresponding to the second rotor position.

5. The positioning system of claim 4, wherein said transistor switches comprise power field effect transistors.

6. The positioning system of claim 4, wherein said control circuitry includes:
a detector for detecting a level of current flowing through said coils; and
a current controller for limiting the current flowing through said coils to a preselected value.

7. The positioning system of claim 6, wherein said current controller rapidly switches selected ones of said transistor switches on and off in response to the level of current flowing through said coils.

8. The positioning system of claim 4, wherein said decay current sense circuitry comprises:
a sense resistor in series with current flowing through said coils; and a voltage comparator connected to said sense resistor for comparing a voltage drop across said resistor with preselected voltage values.

9. A stepper motor positioning system, comprising:
a stepper motor having a rotor and a stator;
first and second filed coils wound adjacent to said stator;
first, second, and third transistor switch pairs, each pair having two transistor switches connected in series, with a first, second, and third electrical node respectively connected between the transistor switches of each switch pair;
wherein said first coil is connected between the first and second nodes, and said second coil is connected between the second and third nodes;
control circuitry including a state machine defining a plurality of normal states and a plurality of transition states, each of said normal and transition states corresponding to a selected pattern of on and off states for said transistor switches;
a sense resistor in series with current flowing through said coils;
a voltage comparator connected to said sense resistor for comparing a voltage drop across said resistor with preselected voltage values; and
first and second sense transistor switches connected respectively to the first and third nodes, wherein said sense transistors switch state when a voltage at the corresponding node rises above and falls below a preselected value;
wherein the rotor is moved from a first to a second position in response to a control input signal, each position having a corresponding normal state, and wherein said control circuitry causes said state machine to move through a selected transition state between the normal states, with said state machine remaining in such transition state until said voltage comparator senses that current flow through said coils has reached a predetermined value, at which time said state machine moves into the normal state corresponding to the second rotor position.

10. The positioning system of claim 9, further comprising:
a power supply having first and second terminals and connected to said transistor switch pairs for supplying current to said coils through said transistor switches;
wherein the preselected value for said first and second sense transistors is approximately equal to a voltage at one of the power supply terminals.

11. A method for controlling a stepper motor having two coils, comprising the steps of:
providing current to the coils through transistors connected thereto, wherein two transistors are connected to a first end of a first coil, two transistors are connected to a first end of a second coil, and two transistors are connected to a common node to which a second end of both coils are connected;
controlling the transistors to be on or off, selected combinations of switch states defining steady states, and other selected combinations of switch states defining transition states;
receiving a control signal; and
in response to the control signal, controlling the transistor switches to move from a present steady state to a selected transition state, followed by a move from the selected transition state to a next steady state, wherein the move from the selected transition state occurs when currents flowing through the coils reach preselected values.

12. The method of claim 11, wherein the control signal indicates which next steady state is desired.

13. The method of claim 10, further comprising the steps of:

sensing the currents flowing through the coils; and
controlling the transistor switches to the next steady state when the sensed currents reach preselected values.

14. The method of claim 11, further comprising the step of:

when in a steady state, controlling the current through the coils by limiting it to a preselected maximum value.

* * * * *